(12) United States Patent
Rosell-Uriz et al.

(10) Patent No.: US 8,399,079 B2
(45) Date of Patent: Mar. 19, 2013

(54) COMPOSITION SUITABLE FOR THERMOFORMABLE SHEETS AND ARTICLES MADE THEREFROM

(75) Inventors: Ana Rosell-Uriz, Zurich (CH); Enrique Torres, Thalwil (CH); Olaf Henschke, Cham (CH)

(73) Assignee: Dow Global Technologies LLC, Midland, MI (US)

( * ) Notice: Subject to any disclaimer, the term of this patent is extended or adjusted under 35 U.S.C. 154(b) by 271 days.

(21) Appl. No.: 11/661,299

(22) PCT Filed: Aug. 31, 2005

(86) PCT No.: PCT/US2005/031278
§ 371 (c)(1),
(2), (4) Date: Feb. 22, 2007

(87) PCT Pub. No.: WO2006/026745
PCT Pub. Date: Mar. 9, 2006

(65) Prior Publication Data
US 2007/0259143 A1    Nov. 8, 2007

Related U.S. Application Data

(60) Provisional application No. 60/606,079, filed on Aug. 31, 2004.

(51) Int. Cl.
*B29D 22/00* (2006.01)
*A61F 13/15* (2006.01)
*B32B 27/32* (2006.01)
*B32B 27/08* (2006.01)
*C08L 23/00* (2006.01)

(52) U.S. Cl. ....... 428/35.7; 428/219; 428/220; 428/516; 428/523; 525/240

(58) Field of Classification Search ................. 428/35.7; 525/240
See application file for complete search history.

(56) References Cited

U.S. PATENT DOCUMENTS
(Continued)

FOREIGN PATENT DOCUMENTS
EP    1003814    5/2000
WO    WO-03/040233    5/2003
(Continued)

OTHER PUBLICATIONS

Miller, Thomas M. et al., "Extrusion Blow Molding of Clarified Polypropylene Rigid Containers: Influence of Exact® Plastomers", ExxonMobil Chemical, Technical Paper, SPE Polyolefins Conference, Feb. 25-27, 2002.
(Continued)

*Primary Examiner* — Gwendolyn Blackwell
*Assistant Examiner* — James Yager
(74) *Attorney, Agent, or Firm* — Whyte Hirschboeck Dudek SC

(57) ABSTRACT

Thermoformable sheet having a thickness of at least 300 micrometers comprising a blend of: (A) from 5 to 20% by weight of a propylene-ethylene copolymer having substantially isotactic propylene sequences, the propylene-ethylene copolymer having a melt flow rate from 4 to 30 g/10 min and comprising at least 70% by weight units derived from propylene and from about 10 to 20% by weight units derived from ethylene; and (B) from 80 to 95% by weight of a polypropylene having a melt flow rate of from 2 to 8 grams/10 minutes, wherein the melt flow rate of the blend is from 2 to 7 grams/10 minutes and wherein the blend exhibits: (1) room temperature Charpy toughness of at least 15 KJ/$m^2$, (2) flexural modulus of at least 1000 MPa, (3) 0° Charpy toughness of at least 2 KJ/$m^2$, and (4) a value for haze of less than 40%.

22 Claims, 5 Drawing Sheets

U.S. PATENT DOCUMENTS

| | | |
|---|---|---|
| 5,597,866 A | 1/1997 | White et al. |
| 5,681,897 A | 10/1997 | Silvis et al. |
| 6,372,847 B1 | 4/2002 | Wouters et al. |
| 6,635,715 B1 | 10/2003 | Datta et al. |
| 6,642,316 B1 | 11/2003 | Datta et al. |
| 6,719,943 B1 | 4/2004 | Neculescu et al. |
| 2004/0122196 A1* | 6/2004 | Pierini et al. .................. 526/351 |

FOREIGN PATENT DOCUMENTS

| | | |
|---|---|---|
| WO | WO-2004/033509 | 4/2004 |
| WO | WO-2004/041928 | 5/2004 |
| WO | WO-2004/063270 | 7/2004 |

OTHER PUBLICATIONS

Walter, P., et al., "Novel Polypropylene Materials", Journal of Macromolecular Science, 1999, vol. 36, pp. 1613-1639 (Abstract Only).

Defosse, Matthew, "Moving Butchers out of Stores Trims Demand for EPS Trays", Modern Plastics; http://www.modplas.com/inc/mparticle.php?section=World%20Tour&thefilename=worldtour08012004_01.

* cited by examiner

COMPOSITION SUITABLE FOR THERMOFORMABLE SHEETS AND ARTICLES MADE THEREFROM

FIELD

This invention pertains to thermoplastic compositions suitable for use in the manufacture of thermoformed articles exhibiting good optics, toughness and stiffness. Additionally, the invention pertains to sheets incorporating the inventive composition. Further, the invention pertains to thermoformed articles, preferably trays for perishable foods, such as meats and fish that incorporate the inventive composition of the invention.

BACKGROUND

Thermoformed trays are used by the packaging industry to hold various perishable food items. One of the largest applications for these types of trays is to hold fresh meat. Historically, expanded polystyrene (EPS) trays have been utilized by local butchers and grocers to contain fresh meat that is prepared by in-store butchers. However, the meat packaging industry is undergoing drastic changes whereby meat is butchered in a remotely located facility and freshly packaged into case-ready containers to be shipped to the grocer, with no need for additional repackaging. This reduces the need for local butchers, but also requires the trays to exhibit sufficient gas barrier properties. Typically, the trays will need to have sufficient barrier properties to ensure the packaged meat has a shelf life of between about 8 to 12 days, enough for packaging, transport, and presentation in the store.

Due to its excellent stiffness, clarity, high temperature resistance, barrier properties and cost, polypropylene has been utilized as a replacement for EPS in thermoformed meat trays. While polypropylene solutions can provide acceptable stiffness and toughness when the appropriate impact modifier is utilized, they typically cannot provide the balance of stiffness, toughness and optics required for many applications.

What is desired is a composition that can be readily formed into thermoformed trays that exhibit an excellent balance of stiffness, toughness and optics. Additionally, it is desirable for the trays to resist stress whitening when manipulated and handled.

Objects of the Invention:

One object of the invention is to provide a composition which can be made into sheets that can be readily formed into thermoformed articles, preferably trays and containers exhibiting an excellent balance of stiffness, toughness and optical properties, such as high clarity and/or low haze.

Another object of the invention is for the thermoformed articles, such as trays, to exhibit the above-mentioned properties and, further, exhibit good resistance to stress whitening.

Still another object of the invention is that the thermoformed articles, preferably trays and containers, exhibit sufficient vapor barrier properties to enable fresh food items contained by the trays and containers to have a suitable shelf life.

A further object of the invention is to provide a composition containing an impact modifier that is very miscible with polypropylene and therefore can be easily blended, even under poor mixing conditions.

SUMMARY

In a first embodiment, the invention is a composition suitable for use in thermoformed articles, such as container/tray applications, the composition comprising:

A. from 5 to 20% by weight of a propylene-ethylene copolymer having substantially isotactic propylene sequences (preferably, from 5 to 15% by weight of the propylene-ethylene copolymer; more preferably, from 7 to 13% by weight of the propylene-ethylene copolymer; most preferably from 8 to 12% by weight of the propylene-ethylene copolymer), the propylene-ethylene copolymer comprising at least 70 weight % units derived from propylene and from about 10 to about 20 weight % of units derived from ethylene (preferably, from 12 to 18 weight % of units derived from ethylene; more preferably, from 13 to 17 weight % of units derived from ethylene; most preferably, from 14 to 16 weight % of units derived from ethylene), the propylene-ethylene copolymer having a melt flow rate from 4 to 30 g/10 min (preferably, from 5 to 25 g/10 min; more preferably from 6 to 20 g/10 min; most preferably from 7 to 12 g/10 min); and B. from about 80 to about 95% by weight of a polypropylene having a melt flow rate of from 2 to 8 g/10 min (preferably, from 3 to 6 g/10 min; more preferably from 3 to 5 g/10 min);

wherein, the melt flow rate of the composition is from 2 to 7 g/10 min (preferably from 3 to 5 g/10 min).

In this first embodiment an article made from the composition and tested in accordance with ISO 179/1eA preferably exhibits room temperature (23° C.) Charpy toughness of at least 15 KJ/m$^2$; preferably, at least 20 KJ/m$^2$, and in some instances at least 25 KJ/m$^2$. Further, in this embodiment an article made from the composition and tested in accordance with ISO 178 preferably exhibits a flexural modulus of at least 1000 MPa, more preferably at least 1100 MPa, and in some instances, such as where stiffness is critical, at least 1300 MPa. Finally, in this embodiment a 1 mm thick injection molded plague made from the composition exhibits a haze value of less than 40% as measured by ASTM D1003; preferably, a haze value of less than 38%; more preferably, less than 37%; most preferably, 36% or less). Additionally, the composition will exhibit 0° C. Charpy toughness (in accordance with ISO 179/1eA) of at least 2 KJ/m$^2$, preferably at least 2.5 KJ/m$^2$, more preferably at least 3 KJ/m$^2$.

In an alternative aspect of the first embodiment, a high crystallinity polypropylene (HCPP) is utilized for the matrix of the composition. The HCPP exhibits: (1) a peak crystallization temperature by DSC of at least 127° C. as measured by DSC, preferably at least 129° C., more preferably at least 130° C., most preferably at least 133° C.; (2) a peak melting temperature by DSC of at least 165° C., preferably at least 166° C.; (3) xylene solubles of less than 2.0% by weight, preferably less than 1.7% by weight, more preferably less than 1.5% by weight, and in some instances less than 1.0% by weight; and (4) a 1% secant flexural modulus according to ASTM D790-00 of at least 300,000 psi, preferably at least 320,000 psi, more preferably at least 330,000 psi. The HCPP preferably also exhibits a crystallinity of at least 70 percent, more preferably at least 70 percent, further more preferably at least 73 percent, and in some instances at least 75 percent. When calculating the crystallinity of the HCPP, 100% isotactic polypropylene is assumed to exhibit a heat of fusion of 165 Joules per gram (J/g). Nucleating agents are often incorporated in the HCPP to obtain the desired properties. Typically, nucleating agents such as ADK NA-11 and ADK NA-21 (both commercially available from Asahi Denka Kokai and Millad 3988 available from Milliken & Company are utilized at levels of between 500 and 2500 ppm, preferably between 650 and 1500 ppm, more preferably between 750 ppm and 1250 ppm based on the weight of the polypropylene utilized. Alternatively, sodium benzoate and similar types of nucleators can be utilized as a nucleator.

One example of HCPP polymers which can be utilized in this alternative aspect of the invention are described in WO 2004/033509 A1, which is incorporated by reference herein in its entirety for its description of HCPP polymers and methods for measuring the properties associated with HCPP polymers. Another example of an HCPP polymer that is useful in this aspect of the invention is utilized in Examples 5-8 described below.

In a particularly preferred aspect of the first embodiment, the propylene-ethylene copolymers exhibit a broad crystallinity distribution, as described later in the section detailing the propylene-ethylene copolymers. In this aspect, the propylene-ethylene copolymer preferably also has a molecular weight distribution (Mw/Mn) of less than 3.5.

In a second embodiment, the invention is a thermoformed article, such as a container or tray, incorporating the composition as discussed in any of the aspects of the first embodiment above. The thermoformed tray preferably is a food tray for containing food (more preferably a tray for holding fresh meat and fish). The container or tray exhibits haze, which is less than the values measured on 1 mm thick injection molded plaques made from the composition as measured in accordance with ASTM D1003; preferably, the thermoformed article, preferably a tray or container, exhibits a value of haze less than 20%. The article, preferably a tray or container, further exhibits very low stress whitening behavior.

In a third embodiment, the invention is a thermoformable sheet incorporating the composition as discussed in any of the aspects of the first embodiment. The thermoformable sheet has a thickness of at least 300 micrometer (μm). For excellent stiffness, the thermoformable sheet preferably is at least 500 micrometers thick, and in some instances, at least 700 micrometers thick.

FIGURES

Figure 4:
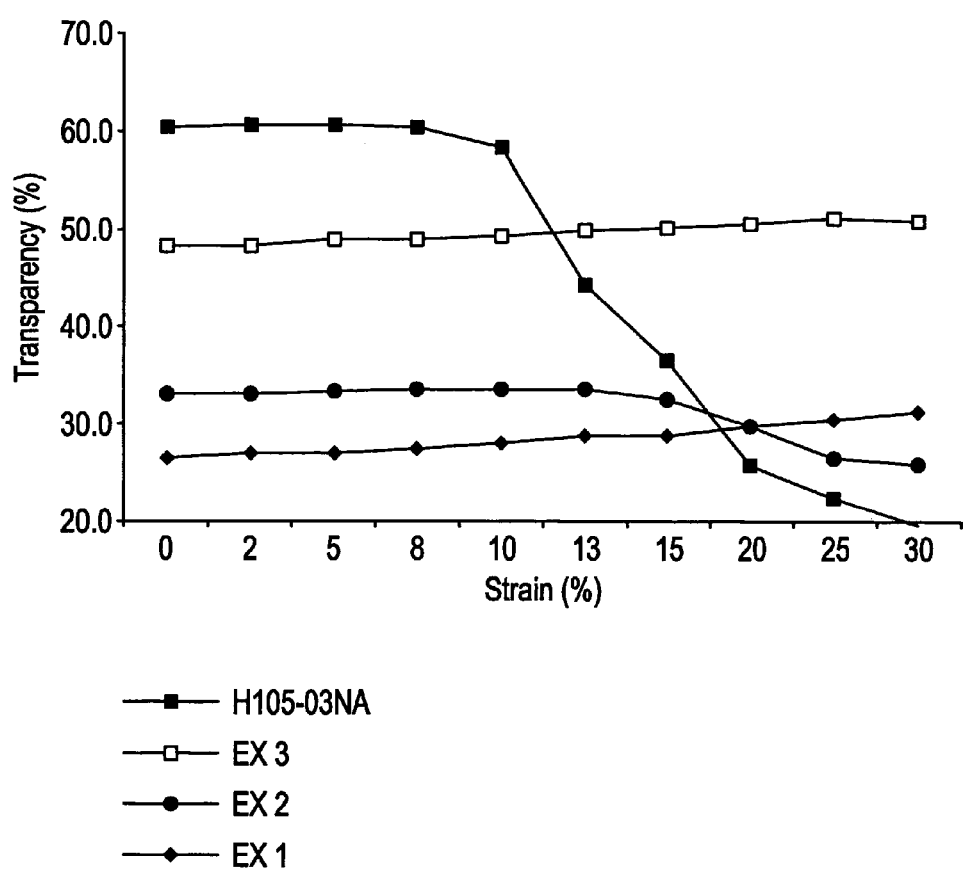

FIG. 4 is a graph showing the resistance of compositions of the current invention to stress whitening behavior. For this graph, the absolute values for transparency at a given strain are not what is important. What is important is the fact that for the inventive blends, as the strain is increased, the transparency of the articles made from the inventive compositions did not significantly decrease and in fact may actually increase. It is believed that this test is indicative of little or no stress whitening behavior in articles made from the composition.

Figure 5:
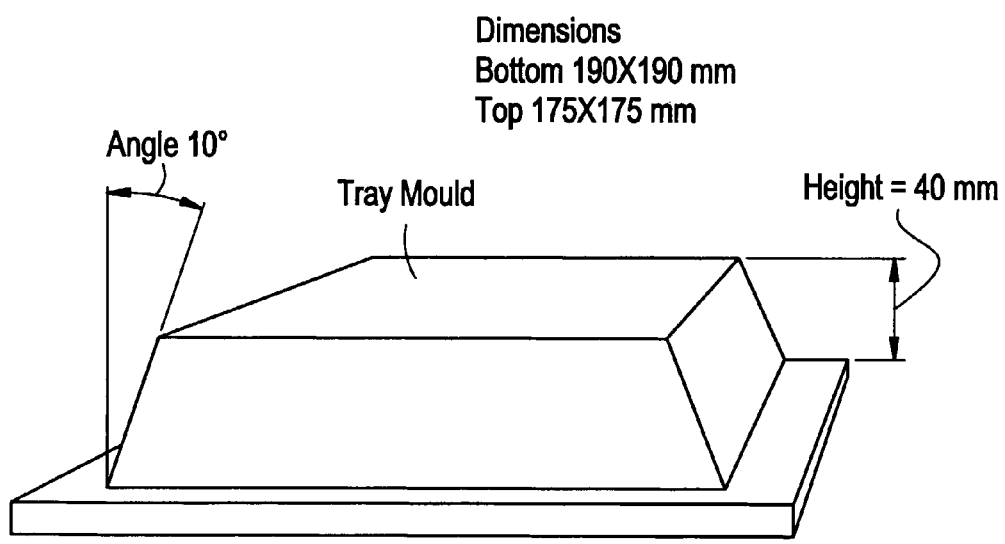

FIG. 5 is a depiction of thermoformed trays made from the composition of the invention. The trays are useful for holding perishable foods, such as fresh fish and meat and fruits and vegetables.

DETAILED DESCRIPTION

Polypropylene for the Composition:

The polypropylene used in the composition may be a homopolymer polypropylene or a mini-random propylene-based copolymer. A mini-random propylene-based copolymer has at least 99% by weight of units derived from propylene, with 1% by weight or less of units derived from alpha-olefin comonomers. The preferred alpha-olefin comonomer is ethylene.

Preferably, if a mini-random propylene-based copolymer is utilized, it most preferably is a high crystalline polymer, such as those described in WO2004/033509 A1 (U.S. Publication 2004-0122196 A1) which are incorporated by reference herein in their entirety for their teachings regarding high crystalline polypropylene homopolymers and copolymers.

If higher stiffness (flexural modulus) is desired in articles made from the composition, then higher crystallinity polypropylenes, such as those described in WO2004/033509 A1 are incorporated into the composition. If toughness and clarity are more critical than stiffness (flexural modulus), then a polypropylene made with a conventional Ziegler-Natta catalyst or other catalyst capable of providing polypropylenes having similar stiffness are utilized in the composition.

The polypropylene useful for the invention has a melt flow rate of from 2 to 8 g/10 min, preferably from 3 to 6 g/10 min, more preferably from 3 to 5 g/10 min.

Propylene-Ethylene Copolymer:

The propylene-ethylene copolymer of the current invention is characterized as having substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well-known in the art and are described in, for example, U.S. Pat. No. 5,504,172 and WO 00/01745, which refer to the isotactic sequence in terms of a triad unit in the copolymer molecular chain determined by $^{13}$C NMR spectra. NMR spectra are determined as described below.

The propylene-ethylene copolymers preferably comprise at least 80% by weight units derived from propylene, more preferably at least 82% by weight units derived from propylene, further more preferably at least 83% by weight units derived from propylene, most preferably at least 84% by weight units derived from propylene.

The propylene-ethylene copolymers exhibit a heat of fusion of: from 1 Joules/gram to 50 Joules/gram; preferably, from 1 Joules/gram to 38 Joules/gram; more preferably from 2 Joules/gram to 34 Joules/gram; most preferably from 3 Joules/gram to 29 Joules/gram.

The propylene-ethylene copolymers of the invention may contain units derived from other alpha-olefins, in addition to units derived from propylene and ethylene. If present, the units derived from other alpha-olefins preferably are present at less than 10% by weight of the composition, more preferably less than 5% by weight of the composition, most preferably less than 2% by weight of the composition.

$^{13}$C NMR spectroscopy is one of a number of techniques known in the art of measuring comonomer incorporation into a polymer and measuring isotactic triad levels in propylene-based copolymers, such as the current propylene-ethylene copolymer. An example of this technique is described for the determination of comonomer content for ethylene/α-olefin copolymers in Randall (Journal of Macromolecular Science, Reviews in Macromolecular Chemistry and Physics, C29 (2

& 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^1$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm.

For propylene-ethylene copolymers, the following procedure is used to calculate the mole percent ethylene in the polymer. Integral regions are determined as follows:

TABLE A

Integral Regions for Determining % Ethylene

| Region designation | PPM |
|---|---|
| A | 44-49 |
| B | 36-39 |
| C | 32.8-34 |
| P | 31.0-30.8 |
| Q | Peak at 30.4 |
| R | Peak at 30 |
| F | 28.0-29.7 |
| G | 26-28.3 |
| H | 24-26 |
| I | 19-23 |

Region D is calculated as D = P × (G × Q)/2.
Region E = R + Q + (G × Q)/2.

TABLE E

Calculation of Region D

PPP = (F + A − 0.5 D)/2
PPE = D
EPE = C
EEE = (E − 0.5 G)/2

TABLE E-continued

Calculation of Region D

PEE = G
PEP = H
Moles P = sum P centered triads
Moles E = sum E centered triads
Moles P = (B + 2A)/2
Moles E = (E + G + 0.5B + H)/2

C2 values are calculated as the average of the two methods above (triad summation and algebraic) although the two do not usually vary. The weight percent of units derived from ethylene in the propylene-ethylene copolymers can be calculated from the values for mole percent ethylene by one of ordinary skill in the art.

In a particularly preferred aspect of the invention, the propylene-ethylene copolymer utilized in the invention comprises a propylene-ethylene copolymer made using a non-metallocene, metal-centered, heteroaryl ligand catalyst as described in U.S. patent application Ser. No. 10/139,786 filed May 5, 2002, which is incorporated by reference herein in its entirety for its teachings regarding such catalysts. For such catalysts, the term "heteroaryl" includes substituted heteroaryl. An example of such a non-metallocene, metal-centered, heteroaryl ligand catalyst is Catalyst A described in the Examples. The propylene-ethylene copolymers made with such non-metallocene, metal-centered, heteroaryl ligand catalyst exhibit a unique regio-error. The regio-error is identified by $^{13}$C NMR peaks corresponding at about 14.6 and about 15.7 ppm, which are believed to be the result of stereoselective 2,1-insertion errors of propylene units into the growing polymer chain. In this particularly preferred aspect, these peaks are of about equal intensity, and they typically represent about 0.02 to about 7 mole percent of the propylene insertions into the homopolymer or copolymer chain.

Figure 1:
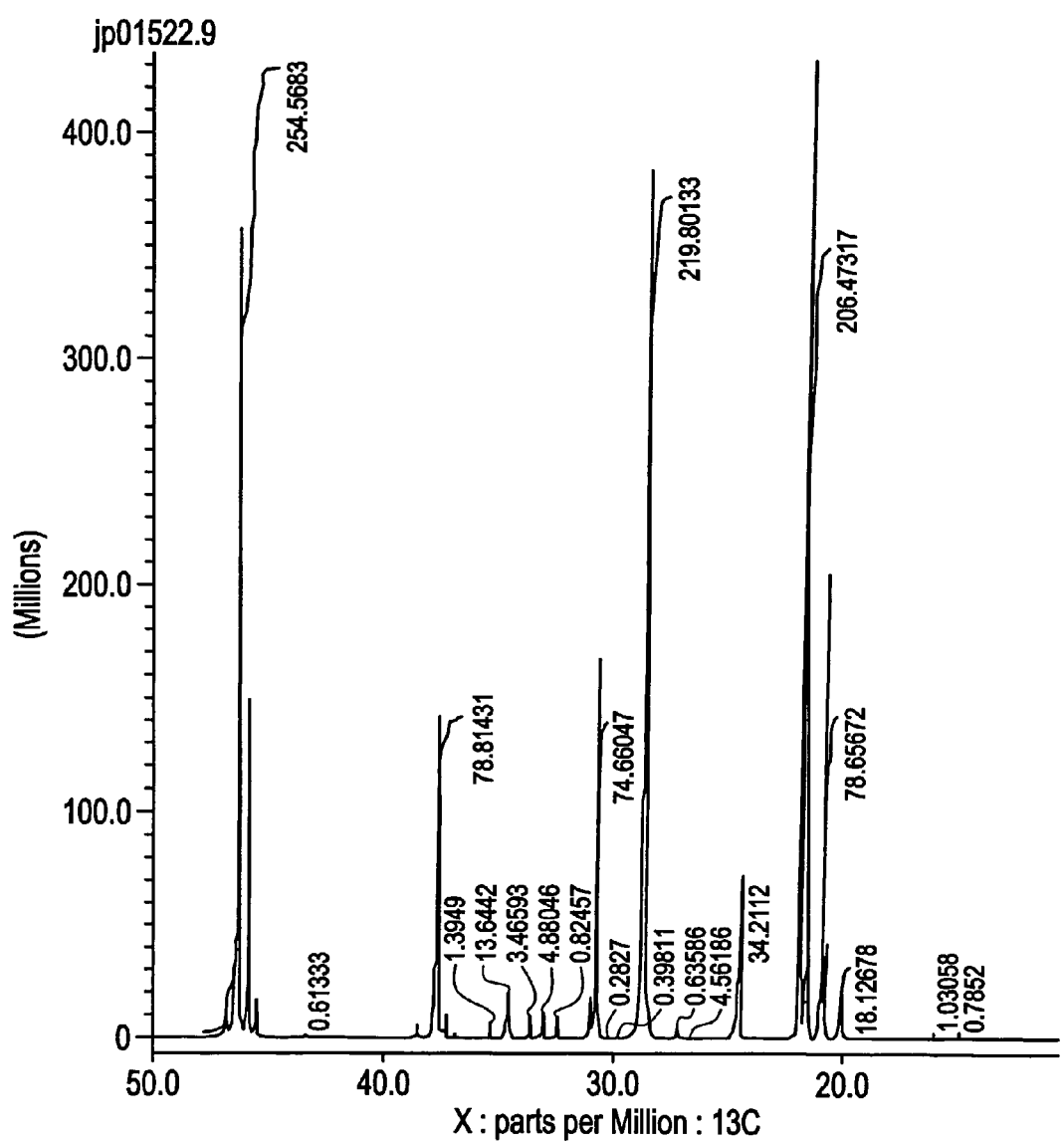
FIG. 1 shows the $^{13}$C NMR Spectrum of a propylene-ethylene copolymer (made with an activated non-metallocene, metal-centered, heteroaryl ligand catalyst similar to Catalyst A), which is similar to the propylene-ethylene copolymers used in the Examples.
Figure 2:
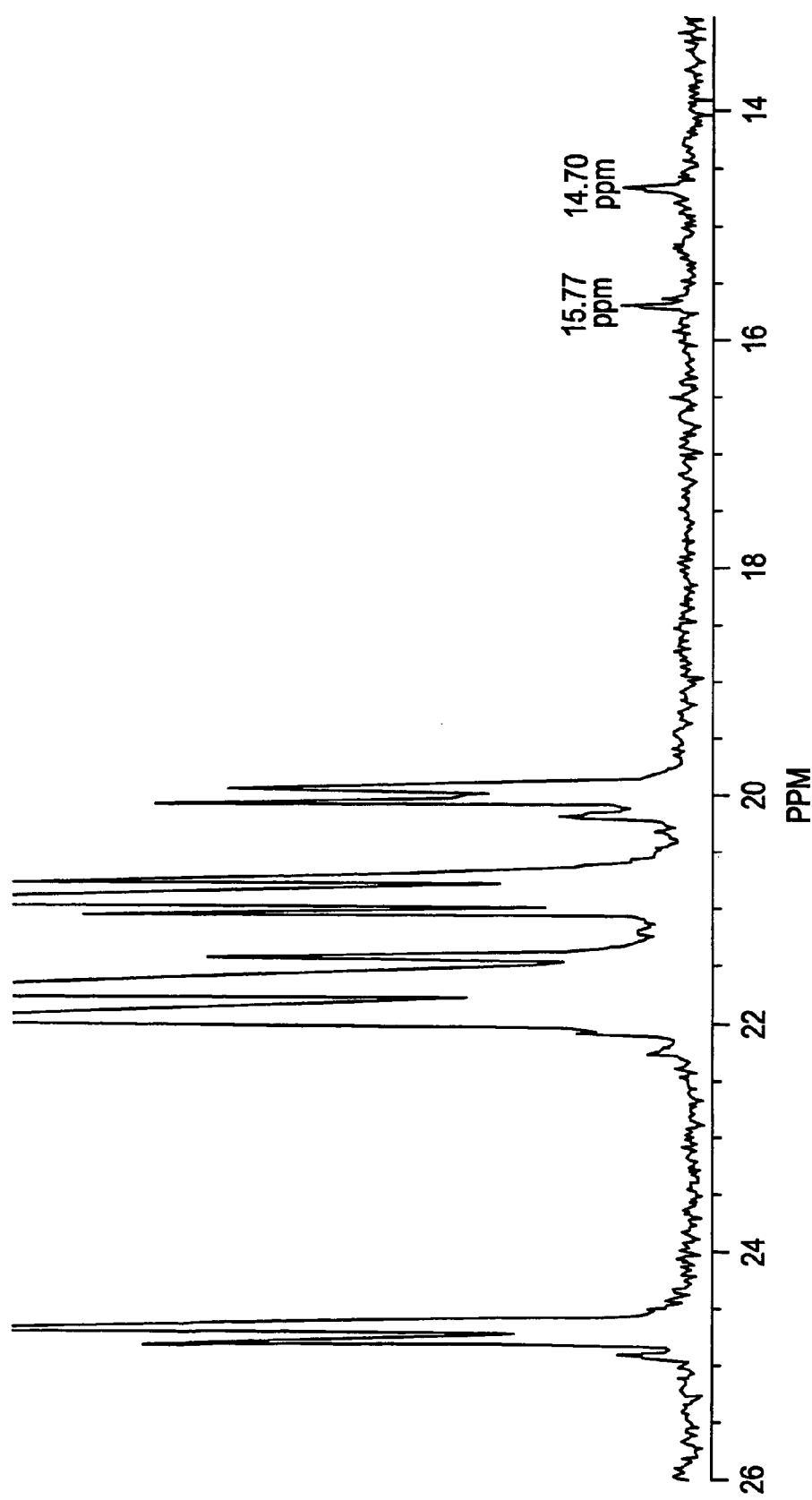
FIG. 2 shows the $^{13}$C NMR Spectrum of same propylene-ethylene copolymer as FIG. 1. However, the spectrum is shown with an expanded Y-axis scale relative to FIG. 1, in order to more clearly show the regio-error peaks at about 14.6 and 15.7 ppm.
Figure 3:
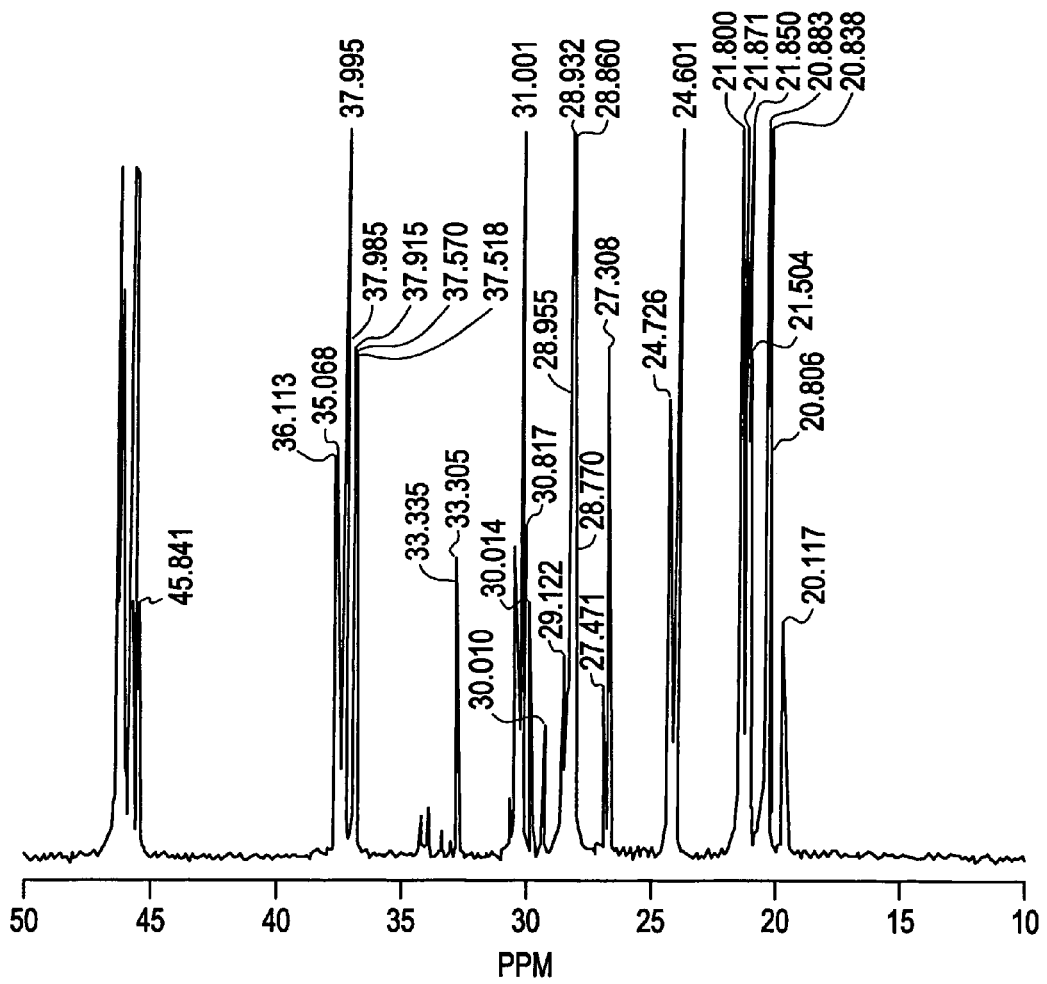
FIG. 3 shows the $^{13}$C NMR Spectrum of a propylene-ethylene copolymer prepared using a metallocene catalyst. The figure demonstrates the absence of regio-error peaks in the region around 15 ppm for a propylene-ethylene copolymer made with a metallocene catalyst.

A comparison of several $^{13}$C NMR spectra further illustrates the unique regio-errors of propylene-ethylene copolymers preferably utilized in the particularly preferred aspect of the invention. FIGS. 1 and 2 are the spectra of the propylene-ethylene copolymers similar to the propylene-ethylene copolymers utilized in the Examples. The spectrum of each polymer reports a high degree of isotacticity (isotactic triad (mm) measured by $^{13}$C NMR of greater than 0.94) and the unique regio-errors of these propylene-ethylene based copolymers. The $^{13}$C NMR spectrum of FIG. 3 is that of a propylene-ethylene copolymer prepared using a metallocene catalyst. This spectrum does not report the regio-error (around 15 ppm) characteristic of the most preferred propylene-ethylene copolymers used in this invention.

Isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene copolymers the mr region is corrected by subtracting 37.5-39 ppm integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art.

Broad Crystallinity Distribution

In another particularly preferred aspect of the invention, the propylene-ethylene copolymers exhibit broad crystallinity distribution. The inventors believe that the use of a propylene-ethylene copolymer having a broad crystallinity distribution will result in compositions having better (i.e. higher values of) toughness.

The determination of crystallizable sequence length distribution can be accomplished on a preparative scale by temperature-rising elution fractionation (TREF). The relative mass of individual fractions can be used as a basis for estimating a more continuous distribution. L. Wild, et al., *Journal of Polymer Science: Polymer. Physics Ed.*, 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. The following table is a summary of conditions used for the analysis of copolymers of propylene. Except as noted the conditions for TREF are consistent with those of Wild, et al., ibid, and Hazlitt, *Journal of Applied Polymer Science: Appl. Polym. Symp.*, 45, 25(1990).

TABLE C

Parameters Used for TREF

| Parameter | Explanation |
| --- | --- |
| Column type and size | Stainless steel shot with1.5 cc interstitial volume |
| Mass detector | Single beam infrared detector at 2920 cm$^{-1}$ |
| Injection temperature | 150° C. |
| Temperature control device | GC oven |
| Solvent | 1,2,4-trichlorobenzene |
| Concentration | 0.1 to 0.3% (weight/weight) |
| Cooling Rate 1 | 140° C. to 120° C. @ −6.0° C./min. |
| Cooling Rate 2 | 120° C. to 44.5° C. @ −0.1° C./min. |
| Cooling Rate 3 | 44.5° C. to 20° C. @ −0.3° C./min. |
| Heating Rate | 20° C. to 140° C. @ 1.8° C./min. |
| Data acquisition rate | 12/min. |

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature.

One statistical factor that can be used to describe the crystallinity distribution of a propylene-ethylene copolymer is the skewness, which is a statistic that reflects the asymmetry of the TREF curve for a particular polymer. Equation 1 mathematically represents the skewness index, $S_{ix}$, as a measure of this asymmetry.

$$S_{ix} = \frac{\sqrt[3]{\sum w_i * (T_i - T_{\text{Max}})^3}}{\sqrt{\sum w_i * (T_i - T_{\text{Max}})^2}}. \qquad \text{Equation 1}$$

The value, $T_{Max}$, is defined as the temperature of the largest weight fraction eluting between 50 and 90° C. in the TREF curve. $T_i$ and $w_i$ are the elution temperature and weight fraction respectively of an arbitrary, $i^{th}$ fraction in the TREF distribution. The distributions have been normalized (the sum of the $w_i$ equals 100%) with respect to the total area of the curve eluting above 30° C. Thus, the index reflects only the shape of the crystallized polymer and any uncrystallized polymer (polymer still in solution at or below 30° C.) has been omitted from the calculation shown in Equation 1. In a particularly preferred aspect of the current invention, the skewness index for the propylene-ethylene copolymer is greater than (−1.2), preferably greater than −1.0, more preferably greater than −0.8, and further more preferably greater than −0.7, and in some instances greater than −0.60. Such a skewness index is indicative of a propylene-ethylene copolymer having a broad crystallinity distribution. All the propylene-ethylene copolymers of the Examples fit within the above-described skewness index.

In addition to the skewness index, another measure of the breadth of the TREF curve (and therefore a measure of the breadth of the crystallinity distribution of a copolymer is the Median Elution Temperature of the final eluting quartile ($T_{M4}$). The Median Elution Temperature is the median elution temperature of the 25% weight fraction of the TREF distribution (the polymer still in solution at or below 30° C. is excluded from the calculation as discussed above for skewness index) that elutes last or at the highest temperatures. The Upper Temperature Quartile Range ($T_{M4}$-$T_{Max}$) defines the difference between the Median Elution Temperature of the final eluting quartile and the peak temperature $T_{Max}$. In this particularly preferred aspect of the invention, the propylene-alpha olefin copolymers have broad crystallinity distributions indicated in part by an Upper Temperature Quartile Range of greater than 4.0° C., preferably at least 4.5° C., more preferably at least 5° C., further more preferably at least 6° C., most preferably at least 7° C., and in some instances, at least 8° C. and even at least 9° C. In general, the higher the value for the Upper Temperature Quartile Range, the broader the crystallinity distribution of the copolymer. All the propylene-ethylene copolymers of the Examples have an Upper Temperature Quartile Range as described above for broad crystallinity distribution resins.

Further, in this particularly preferred aspect, propylene-ethylene copolymers show unusual and unexpected results when examined by TREF. The distributions tend to cover a large elution temperature range while at the same time giving a prominent, narrow peak. In addition, over a wide range of ethylene incorporation, the peak temperature, $T_{Max}$, is near 60° C. to 65° C. In conventional propylene-ethylene copolymers, for similar levels of ethylene incorporation, this peak moves to higher elution temperatures with lower ethylene incorporation.

For conventional metallocene catalysts the approximate relationship of the mole fraction of propylene, $X_p$, to the TREF elution temperature for the peak maximum, $T_{Max}$, is given by the following equation:

$$\text{Log}_e(X_p) = -289/(273 + T_{max}) + 0.74$$

For the propylene-ethylene copolymers in this particularly preferred aspect, the natural log of the mole fraction of propylene, LnP, is greater than that of the conventional metallocenes, as shown in this equation:

$$LnP > -289/(273+T_{max})+0.75$$

Molecular Weight and Molecular Weight Distribution

In some aspects of the invention, the propylene-based copolymer has a molecular weight distribution (MWD), defined as weight average molecular weight divided by number average molecular weight (Mw/Mn) of 3.5 or less.

Molecular weight distribution of the polymers is determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

The molecular weight determination is deduced by using ten narrow molecular weight distribution polystyrene standards (from Polymer Laboratories, EasiCal PSI ranging from 580-7,500,000 g/mole) in conjunction with their elution volumes. The equivalent propylene-ethylene copolymer molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation:

$$\{N\}=KM^a$$

where $K_{pp}=1.90E-04$, $a_{pp}=0.725$ and $K_{ps}=1.26E-04$, $a_{ps}=0.702$.

Differential Scanning Calorimetry

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials*, Academic Press, 1981). In the particularly preferred aspect of the invention, propylene-ethylene copolymers are utilized in the invention and are characterized by a DSC curve with a $T_{me}$ that remains essentially the same and a $T_{max}$ that decreases as the amount of unsaturated comonomer in the copolymer is increased. $T_{me}$ means the temperature at which the melting ends and $T_{max}$ means the peak melting temperature, both as determined by one of ordinary skill in the art from DSC analysis using data from the final heating step.

Differential Scanning Calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The propylene-based copolymers samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and the heated at a high rate of about 100° C./min to a temperature of about 30° C. above the melt temperature. The sample is kept at this temperature for about 3 minutes. Then the sample is cooled at a rate of 10° C./min to −40° C., and kept isothermally at that temperature for 3 minutes. Consequently the sample is heated at a rate of 10° C./min until complete melting.

The output data from the DSC consists of time (sec), temperature (° C.), and heat flow (watts). Subsequent steps in the analysis of melting endotherms are as follows. First, the heat flow is divided by the sample mass to give specific heat flow (units: W/g). Second, a baseline is constructed and subtracted from the specific heat flow to give baseline-subtracted heat flow. For the analyses presented here, a straight-line baseline is used. The lower temperature limit for the baseline is chosen as a point on the high temperature side of the glass transition. The upper temperature limit for the baseline is chosen as a temperature about 5-10° C. above the completion of the melting endotherm. Although a straight-line baseline is theoretically not exact, it offers greater ease and consistency of analysis, and the error introduced is relatively minor for samples with specific heats of melting of about 15-20 Joules per gram or higher. Employing a straight-line baseline in lieu of a more theoretically correct baseline does not substantially affect any of the results or conclusions presented below, although the fine details of the results would be expected to change with a different prescription of the instrumental baseline.

The resulting enthalpy curves are analyzed for peak melting temperature (which is the temperature at which the baseline-subtracted heat flow is a maximum (here the convention is that heat flow into the sample is positive)), onset and peak crystallization temperatures, heat of fusion and heat of crystallization, $T_{me}$, and any other DSC analyses of interest. The factor that is used to convert heat of fusion into nominal weight % crystallinity is 165 J/g=100 weight % crystallinity. With this conversion factor, the total crystallinity of a propylene-based copolymer (units: weight % crystallinity) is calculated as 100% times heat of fusion divided by 165 J/g.

Melt flow rate (MFR) measurement is performed according to ASTM D-1238, Condition 230° C./2.16 kilogram (kg) weight. As with the melt index, the melt flow rate is inversely proportional to the molecular weight of the polymer. Thus, the higher the molecular weight, the lower the melt flow rate, although the relationship is not linear.

Thermoformed Tray and/or Container:

The thermoformed articles, preferably trays or containers, made from the composition may be used for a variety of applications. They will be particularly useful for holding (containing) fresh, perishable food, such as fresh meat and fish. The thermoformed articles will exhibit an excellent balance of stiffness (as measured by flexural modulus), toughness (as measured by Charpy) and optics (as measured by haze). In addition to the properties already described, articles made from the inventive compositions and tested in accordance with Charpy (ISO 179/1 eA) will exhibit a Charpy toughness of at least 2 KJ/m², preferably at least 3 KJ/m².

EXAMPLES

The polymers disclosed in the examples are the following:

P-E 1 is a propylene-ethylene copolymer made as described below, containing 14 percent by weight units derived from ethylene and having a melt flow rate of 8 g/10 min. This copolymer exhibits a heat of fusion of 4.3 Joules/gram, which corresponds to a crystallinity of 3 wt %, and a MWD of 3. This propylene-ethylene copolymer exhibits triad isotacticity (mm) of 0.96.

P-E 2 is a propylene-ethylene copolymer made as described below, containing 12 percent by weight units derived from ethylene and having a melt flow rate of 8 g/10 min. This copolymer exhibits a heat of fusion of 12.8 Joules/gram, which corresponds to a crystallinity of 8 wt %, and a MWD of 3. This propylene-ethylene copolymer exhibits triad isotacticity (mm) of 0.96.

P-E 3 is a propylene-ethylene copolymer made as described below, containing 12 percent by weight units derived from ethylene and having a melt flow rate of 25 g/10 min. This copolymer exhibits a heat of fusion of 17.4 Joules/gram, which corresponds to a crystallinity of 11 wt %, and a MWD of 3. This propylene-ethylene copolymer exhibits triad isotacticity (mm) of 0.96.

H105-03NA is a polypropylene homopolymer available from The Dow Chemical Company made with a Ziegler-Natta catalyst. The resin has a melt flow rate of 3.2 g/10 min, contains 600 ppm of sodium benzoate nucleator and has a flexural modulus of 1600 MPa as measured by ISO 178.

Catalyst A

Synthesis of Catalyst A

Hafnium, [N-[2,6-bis(1-methylethyl)phenyl]-α-[2-(1-methylethyl)phenyl]-6-(1-naphthalenyl-κ-C²)-2-pyridinemethanaminato(2−)-κN¹, κN²]dimethyl-

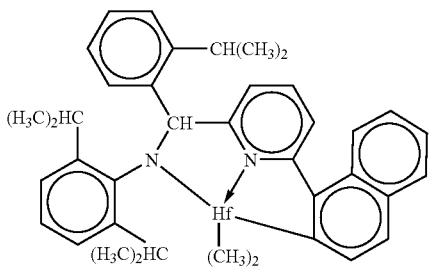

a) 2-Formyl-6-bromopyridine. This compound is synthesized according to literature procedures, *Tetrahedron Lett.*, (2001) 42, 4841.

b) 6-Bromo-2-(2,6-diisopropylphenyl)iminopyridine). A dry, 500 mL 3-neck round bottom flask is charged with a solution of 2-formyl-6-bromopyridine (72.1 g, 383 mmol) and 2,6-diisopropylaniline (72.5 g, 383 mmol) in 500 mL of anhydrous toluene containing 0.3 nm pore size molecular sieves (6 g) and 80 mg of p-TsOH. The reactor is equipped with a condenser, an over head mechanical stirrer and a thermocouple well. The mixture is heated to 70° C. under $N_2$ for 12 h. After filtration and removal of the volatiles under reduced pressure, a brown oil is isolated. Yield was 109 g, 81.9 percent.

GC/MS 346 (M⁺), 331, 289, 189, 173, 159, 147, 131, 116, 103, 91, 78.

c) 6-(1-Naphthyl)-2-[(2,6-diisopropylphenyl)imino]pyridine. Naphthylboronic acid (54.5 g, 316 mmol) and $Na_2CO_3$ (83.9 g, 792 mmol) are dissolved into 200 mL of degassed 1:1 $H_2O$/EtOH. This solution is added to a toluene solution (500 mL) of 6-bromo-2-(2,6-diisopropylphenyl)-iminopyridine (109 g, 316 mmol). Inside of a dry box, 1 g (0.86 mmol) of tetrakis(triphenyl-phosphine)palladium(0) is dissolved in 50 mL of degassed toluene. The solution is removed from the dry box and charged into the $N_2$ purged reactor. The biphasic solution is vigorously stirred and heated to 70° C. for 4-12 hours. After cooling to room temperature, the organic phase is separated, the aqueous layer is washed with toluene (3×75 mL), the combined organic extracts are washed with $H_2O$ (3×200 mL) and dried over $MgSO_4$. After removing the volatiles under reduced pressure, the resultant light yellow oil is purified via recrystallization from methanol to give a yellow solid. Yield 109 g, 87.2 percent; mp 142-144° C.

¹H NMR (CDCl₃) δ 1.3 (d, 12H), 3.14 (m, 2H), 7.26 (m, 3H), 7.5-7.6 (m, 5H), 7.75-7.8 (m, 3H), 8.02 (m 1H), 8.48 (m, 2H).

¹³C NMR (CDCl₃) δ 23.96, 28.5, 119.93, 123.50, 124.93, 125.88, 125.94, 126.49, 127.04, 127.24, 128.18, 128.94, 129.7, 131.58, 134.5, 137.56, 137.63, 138.34, 148.93, 154.83, 159.66, 163.86.

GC/MS 396 (M⁺), 380, 351, 337, 220, 207, 189, 147.

d) 2-Isopropylphenyl lithium. Inside an inert atmosphere glovebox, n-butyl lithium (52.5 mmol, 21 mL of 2.5M in hexanes) is added by addition funnel over a period of 35-45 min to an ether solution (50 mL) of 2-isopropyl bromobenzene (9.8 g, 49.2 mmol). After the addition is complete, the mixture is stirred at ambient temperature for 4 h. Then, the ether solvent is removed under vacuum overnight. The next day hexane is added to the remaining white solid and the mixture filtered, washed with additional hexane, and then vacuum dried. 2-Isopropylphenyl lithium (4.98 g, 39.52 mmol) is collected as a bright white powder. A second crop of product (0.22 g) is later obtained from a second filtration of the original hexane filtrant.

¹H NMR (d₈-THF) δ 1.17 (d, J=6.8 Hz, 6H), 2.91 (sept, J=6.8, 1H), 6.62-6.69 (multiplets, 2H), 6.77 (d, J=7.3 Hz, 1H), 7.69 (multiplet, 1H).

¹³C NMR (d₈-THF) δ 25.99, 41.41, 120.19, 122.73, 122.94, 142.86, 160.73, 189.97.

e) 2-pyridinemethanamine, N-[2,6-bis(1-methylethyl)phenyl]-α-[2-(1-methylethyl)phenyl]-6-(1-naphthalenyl).

The imine, 6-(1-naphthyl)-2-[(2,6-diisopropylphenyl)imino]pyridine of step c) (2.20 g, 5.6 mmol) is magnetically stirred as a slurry in 60-70 mL of dry ether under a nitrogen atmosphere. An ether solution of 2-isopropylphenyl lithium (1.21 g, 9.67 mmol in 25 mL dry ether) is added slowly using a syringe over a period of 4-5 min. After the addition is complete, a small sample is removed, quenched with 1N NH₄Cl and the organic layer analyzed by high pressure liquid chromatography (HPLC) to check for complete consumption of starting material. The remainder of the reaction is quenched by the careful, slow addition of 1N NH₄Cl (10 mL). The mixture is diluted with more ether and the organic layer washed twice with brine, dried (Na₂SO₄), filtered, and stripped of solvent under reduced pressure. The crude product obtained as a thick red oil (2.92 g; theoretical yield=2.87 g) is used without further purification.

¹H NMR (CDCl₃) δ 0.96 (d, J=6.6 Hz, 3H), 1.006 (d, J=6.8 Hz, 3H), 1.012 (d, J=6.8 Hz, 6H), 1.064 (d, J=6.8 Hz, 6H), 3.21-3.34 (multiplets, 3H), 4.87 (br s, NH), 5.72 (s, 1H), 6.98 (d, J=7.6 Hz, 1H) 7.00-7.20 (multiplets, 7H), 7.23-7.29 (multiplets, 4H), 7.51 (d, J=7.1 Hz 1H), 7.60-7.65 (multiplets, 2H), 7.75 (multiplet, 1H), 8.18 (multiplet, 1H).

$^{13}$C NMR (CDCl$_3$) δ 23.80, 24.21, 24.24, 24.36, 28.10, 28.81, 67.08, 120.20, 122.92, 123.96, 124.42, 125.35, 125.81, 126.01, 126.28, 126.52, 126.58, 126.65, 127.80, 128.52, 128.62, 129.25, 131.82, 134.52, 136.81, 138.82, 140.94, 143.37, 143.41, 146.66, 159.05, 162.97.

f) Hafnium, [N-[2,6-bis(1-methylethyl)phenyl]-α-[2-(1-methylethyl)phenyl]-6-(1-naphthalenyl-κ-C$^2$)-2-pyridinemethanaminato(2-)-κN$^1$, κN$^2$]dimethyl- A glass jar is charged with 8.89 mmol of the ligand from step e) dissolved in 30 mL toluene. To this solution is added 8.98 mmol of n-BuLi (2.5 M solution in hexanes) by syringe. This solution is stirred for 1 hour, then 8.89 mmol of solid HfCl$_4$ are added. The jar is capped with an air-cooled reflux condenser and the mixture is heated at reflux for 1 hour. After cooling, 31.1 mmol of MeMgBr (3.5 equivalents, 3.0 M solution in diethyl ether) are added by syringe and the resulting mixture stirred overnight at ambient temperature. Solvent (toluene, hexanes and diethyl ether) is removed from the reaction mixture using a vacuum system attached to the drybox. Toluene (30 mL) is added to the residue and the mixture filtered, and the residue (magnesium salts) is washed with additional toluene (30 mL). Solvent is removed by vacuum from the combined toluene solution, and hexane is added, then removed by vacuum. Hexane is again added and the resulting slurry is filtered and the product washed with pentane to give the desired product as a yellow powder.

$^1$H NMR (C$_6$D$_6$): δ 8.58 (d, J=7.8 Hz, 1H), 8.25 (d, J=8.4 Hz, 1H), 7.82 (d, J=7.5 Hz, 1H), 7.72 (d, J=6.9 Hz, 1H), 7.50 (d, J=8.1 Hz, 1H), 7.36-7.27 (multiplets, 3H), 7.19-6.99 (multiplets, 7H), 6.82 (t, J=8.1 Hz, 1H), 6.57 (s, 1H), 6.55 (d, J=7.8 Hz, 1H), 3.83 (septet, J=6.9 Hz, 1H), 3.37 (septet, J=6.9 Hz, 1H), 2.89 (septet, J=6.9 Hz, 1H), 1.38 (d, J=6.6 Hz, 3H), 1.37 (d, J=6.9 Hz, 3H), 1.17 (d, J=6.9 Hz, 3H), 1.15 (d, J=7.2 Hz, 3H), 0.96 (s, 3H), 0.70 (s, 3H), 0.69 (d, J=5.4 Hz, 3H), 0.39 (d, J=6.9 Hz, 3H).

General Continuous Loop Solution Propylene-Ethylene Copolymerization Procedure

The propylene-ethylene copolymers used in the Examples are made according to the following procedure. Catalyst A is used to manufacture all the propylene-ethylene copolymers of the Examples.

The polymerization process is exothermic. There are ~900 BTU released per pound of propylene polymerized and ~1,500 BTU released per pound of ethylene polymerized.

The primary process design consideration is how to remove the heat of reaction. The propylene-ethylene copolymers of Examples 1-8 are produced in a low-pressure, solution polymerization loop reactor, made up of a 3" loop pipe plus two heat exchanges, the total volume of which is 31.4 gals. Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentrations equal to 18 wt %. The adiabatic temperature rise of the solution accounts for some of the heat removal from the polymerization reaction. Heat exchangers within the reactor are utilized to remove the remaining heat of reaction, allowing for reactor temperature control at 105° C.

The solvent used is a high purity iso-paraffinic fraction purchased from Exxon called Isopar E. Fresh propylene is passed through a bed of Selexsorb COS for purification before mixing with the recycle stream (contains solvent, propylene, ethylene, and hydrogen). After mixing with the recycle stream, the combined stream is passed through a bed of 75 wt % Molecular Sieve 13× and 25 wt % Selexsorb CD for further purification before using a high pressure (700 psig) feed pump to pump the contents to the reactor. Fresh ethylene is passed through a Selexsorb COS bed for purification before compressing the stream to 750 psig. Hydrogen (a telogen used to reduce molecular weight) is mixed with the compressed ethylene before the two are mixed/dissolved into the liquid feed. The total stream is cooled to the appropriate feed temperature (5° C.). The reactor operates at 525 psig and a control temperature equal to 105° C. The propylene conversion in the reactor is maintained by controlling the catalyst injection rate. The reaction temperature is maintained by controlling the water temperature across the shell side of the heat exchanger at 85° C. The residence time in the reactor is short, 10 minutes. The propylene conversion per reactor pass is 60 wt %.

Upon exiting the reactor, water and additive are injected into the polymer solution. The water hydrolyzes the catalyst, terminating the polymerization reaction. The additives consist of antioxidants, 500 ppm of Irganox™ 1010 and 1000 ppm of Irgafos™ 168, that remain with the polymer and act as stabilizers to prevent polymer degradation while in storage before subsequent fabrication at the end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

Blending of the Polymers:

The compositions can be made by various processes known to one of ordinary skill in the art, such as: (a) dry blending of the component pellets; (b) direct feeding of the component pellets via a blender system (volumetric or gravimetric) mounted on an extruder; (c) compounding the pellet components in a compounding extruder producing pellets of compounded product; and/or (d) any other blending techniques known to one of ordinary skill in the art. Due to the good compatibility between the polypropylene (which makes up the majority of the matrix) and the propylene-ethylene copolymer (which is dispersed within the matrix), blending through direct feeding of the component pellets via a blender system mounted on a single or twin screw extruder will sufficiently blend the components. Also, the compositions of the invention may be made by in-reactor processes known to one of ordinary skill in the art, whereby the individual polymer components are made in individual reactors and/or polymerization steps either in series or parallel, with the components being combined into an "in-reactor blend."

The compositions are extruded into 700 micron thick sheet and thermoformed in accordance with methods known to one of ordinary skill in the art. As discussed earlier, the sheets used for thermoforming (thermoformable sheets) generally are at least 300 microns (μm). In the following examples, 700 microns (μm) thick sheets were utilized due to the deep draw utilized in thermoforming the exemplified trays. The blends can be extruded in commercial lines and thermoformed using both in-line (i.e., extruding and thermoforming on the same line) and off-line technologies. The machine used to extrude the sheets of the examples is a Davo extruder (screw size 45 mm, output 50 kg/hour). The extruder was operated with a temperature profile so that the melt temperature was 210° C. at the exit of the die and the rolls temperatures at the calendaring unit were 60/50/60° C.

An ILLIG model UA-100 Thermoformer was used to thermoform the sheets into trays (containers). Thermoforming was done off-line using a preheated sheet at a temperature between 160 and 175° C. with a mold at a temperature between 30 and 60° C. The resulting trays have the geometry depicted in FIG. 5.

Subsequent testing on the trays indicates that they exhibit excellent resistance to stress whitening and have haze values equivalent to or less than the haze values exhibited by one millimeter thick plaques made from the compositions. The wall thickness of the tray ranges between 300 and 450 μm and the haze (according to ASTM D1003) was 20% or better.

Examples 1-4

TABLE 1

| Example | Polypropylene H105-03NA | Propylene-Ethylene Copolymer | Composition Melt Flow Rate (g/10 min) |
|---|---|---|---|
| 1 | 90 wt % | P-E 1 (10 wt %) | 4.0 |
| 2 | 85 wt % | P-E 1 (15 wt %) | 4.0 |
| 3 | 85 wt % | P-E 3 (15 wt %) | 4.6 |
| 4 | 85 wt % | P-E 2 (15 wt %) | 4.0 |

The compositions of Examples 1-4 are tested for the properties set forth in Table 2, below.

TABLE 2

| | EXAMPLE NUMBER | | | |
|---|---|---|---|---|
| | 1 | 2 | 3 | 4 |
| Charpy (ISO 179/1 eA@23° C.) (KJ/m$^2$) | 20.8 | P37* | 18.5 | 27.5 |
| % haze (ASTM D1003) (one millimeter thick plaque) | 35 | 36 | 29 | 34 |
| Flexural Modulus (ISO 178) (MPa) | 1160 | 1015 | 1080 | 1070 |

*P37 showed only partial break during the test

The data in Table 2 demonstrates that all the compositions of the invention result in an excellent balance of optical properties, toughness and stiffness. However, it is believed that only the compositions utilizing P-E 1 are able to achieve the desired balance of stiffness, toughness and optical properties, while at the same time only utilizing from 8 to 12 weight percent of the propylene-ethylene copolymer in the composition.

Tables 3 and 4 show a final aspect of the invention. The compositions of examples 5 through 8 utilize a high crystallinity polypropylene (HCPP) as the matrix of the composition with the propylene-ethylene copolymers dispersed therein.

The HCPP used in examples 5 through 8 is a homopolymer polypropylene made in a slurry reactor using a Ziegler-Natta catalyst, with dicyclopentyldimethoxysilane as an external donor, and trialkylaluminum as an activator. 600 ppm of a nucleating agent sodium benzoate is incorporated into the HCPP. The HCPP has a melt flow rate of 3.2 grams/10 minutes, xylene solubles of 1.6% by weight, a molecular weight distribution of 7.9 and exhibits: (1) a peak crystallization temperature of 129° C., (2) a peak melting temperature of 166° C., (3) a heat of fusion of 116 Joules/gram (corresponding to a crystallinity of 70%, and a (4) 1% secant flexural modulus of 330,000 psi according to ASTM D790-00.

TABLE 3

| Example | Polypropylene High Crystallinity HPP | Propylene-Ethylene Copolymer | Composition Melt Flow Rate (g/10 min) |
|---|---|---|---|
| 5 | 90 wt % | P-E 1 (10 wt %) | 3.6 |
| 6 | 85 wt % | P-E 1 (15 wt %) | 3.8 |
| 7 | 85 wt % | P-E 3 (15 wt %) | 4.4 |
| 8 | 85 wt % | P-E 2 (15 wt %) | 3.7 |

The compositions of Examples 5-8 are tested for the properties as described in Table 4, below.

TABLE 4

| | EXAMPLE NUMBER | | | |
|---|---|---|---|---|
| | 5 | 6 | 7 | 8 |
| Charpy (ISO 179/1 eA@23° C.) (KJ/m$^2$) | 12.5 | 27.3 | 9.8 | 20 |
| % haze (ASTM D1003) (one millimeter thick plaque) | 36 | 39 | 28 | 36 |
| Flexural Modulus (ISO 178) (MPa) | 1440 | 1300 | 1330 | 1350 |

Referring to the Tables, it can be seen that by utilizing a HCPP for the matrix, it is possible to increase the stiffness of the blend while maintaining similar values for haze as compared to a blend incorporating a lower crystallinity polypropylene (Tables 1 and 2). Additionally, it can be seen from the Tables that the toughness is slightly lower in the compositions incorporating the HCPP. By increasing the amount of propylene-ethylene copolymer (from 12% to 16% by weight propylene-ethylene copolymer in the composition) and using a propylene-ethylene copolymer having from 13% to 17% by weight units derived from ethylene, a composition exhibiting room temperature Charpy toughness of at least 15 KJ/m$^2$ can be obtained, preferably at least 20 KJ/m$^2$, more preferably at least 25 KJ/m$^2$.

In this final aspect, the invention is a composition containing the components as described for the other aspects of the invention, the only difference being the use of a HCPP for the matrix. In this final aspect, the compositions and the thermoformable sheets and thermoformed articles made therefrom exhibit all the properties described for the other aspects of the invention. However, in this final aspect the blend exhibits a flexural modulus by ISO 178 of at least 1300 MPa and a room temperature (23° C.) Charpy toughness of at least 9 KJ/m$^2$, preferably at least 12 KJ/m$^2$, and as described above can be at least 15 KJ/m$^2$, more preferably at least 20 KJ/m$^2$, when greater amounts of propylene-ethylene copolymers are utilized.

We claim:

1. A thermoformable sheet having a thickness of at least 300 μm, the thermoformable sheet comprising a blend of:
   (A) from 10 to 15% by weight of a propylene-ethylene copolymer having substantially isotactic propylene sequences having an isotactic triad (mm) measured by $^{13}$C NMR of greater than 0.85 and comprising:
      (1) at least 70% by weight units derived from propylene and from about 10 to 16% by weight units derived from ethylene;
      (2) the propylene-ethylene copolymer having a melt flow rate from 4 to 30 grams/10 minutes and a heat of fusion from 1 to 50 Joules/gram; and
   (B) from 80 to about 95% by weight of a high crystallinity polypropylene homopolymer or high crystallinity propylene-based copolymer having up to 1% by weight of units derived from an α-olefin comonomer, having a melt flow rate of from 2 to 8 grams/10 minutes and xylene solubles less than 2% by weight,
   wherein, the melt flow rate of the blend is from 2 to 7 grams/10 minutes and the blend exhibits:
      (1) room temperature (23° C.) Charpy toughness of at least 9 KJ/m$^2$;
      (2) flexural modulus of at least 1300 MPa;
      (3) 0° Charpy toughness of at least 2 KJ/m$^2$; and
      (4) a value for haze of less than 40%.

2. The thermoformable sheet of claim 1, wherein the blend has a melt flow rate of from 3 to 5 grams/10 minutes and the propylene-ethylene copolymer (A) has a melt flow rate of from 5 to 25 grams/10 minutes.

3. The thermoformable sheet of claim 1, wherein the propylene-ethylene copolymer (A) has a melt flow rate of from 6 to 20 grams/10 minutes.

4. The thermoformable sheet of claim 1, wherein the propylene-ethylene copolymer (A) has a melt flow rate of from 7 to 12 grams/10 minutes.

5. The thermoformable sheet of claim 1, wherein the blend exhibits:
   (1) room temperature (23° C.) Charpy toughness of at least 9 KJ/m$^2$;
   (2) flexural modulus of at least 1330 MPa by ISO 178;
   (3) 0° Charpy toughness of at least 2 KJ/m$^2$; and
   (4) a value for haze of less than 38%.

6. The thermoformable sheet of claim 1, wherein the blend exhibits:
   (1) room temperature (23° C.) Charpy toughness of at least 20 KJ/m$^2$;
   (2) flexural modulus of at least 1350 MPa; and
   (3) 0° Charpy toughness of at least 2.5 KJ/m$^2$.

7. The thermoformable sheet of claim 1, wherein the blend exhibits a value for haze of less than 37%.

8. The thermoformable sheet of claim 1, wherein the blend exhibits a flexural modulus of at least 1330 MPa.

9. The thermoformable sheet according to claim 1, wherein the Component (A) propylene-ethylene copolymer exhibits a skewness index greater than −1.2.

10. The thermoformable sheet of claim 9, wherein the Component (A) propylene-ethylene copolymer is exhibits an Upper Temperature Quartile Range of greater than 4.0° C.

11. The thermoformable sheet of claim 10, wherein the Component (A) propylene-ethylene copolymer has a molecular weight distribution (Mw/Mn) of less than 3.5.

12. The thermoformable sheet according to claim 1, wherein the Component (A) propylene-ethylene copolymer exhibits a molecular weight distribution (Mw/Mn) of less than 3.5.

13. The thermoformable sheet of claim 1, wherein the high crystallinity polypropylene homopolymer or propylene-based copolymer has a crystallinity of at least 70%.

14. A thermoformed article made from the thermoformable sheet of claim 1.

15. The thermoformed article of claim 14 comprising a container or tray.

16. The thermoformed container or tray of claim 15, wherein the container or tray is for containing food.

17. The thermoformed article of claim 14, wherein the Component (A) propylene-ethylene copolymer exhibits a molecular weight distribution (Mw/Mn) of less than 3.5.

18. The thermoformed article of claim 14, wherein the article comprises a food container and a wall of the container exhibits a value of haze of less than 38%.

19. The thermoformed article of claim 14, wherein the article comprises a food container and a wall of the container exhibits a value of haze of less than 37%.

20. The thermoformed article of claim 14, wherein the article comprises a meat tray and a wall of the meat tray exhibits a value of haze of less than 36%.

21. The thermoformed article of claim 14, wherein the article exhibits low stress whitening behavior.

22. The thermoformed article of claim 14, wherein the article comprises a tray or container exhibiting a value of haze of less than 20% measured according to ASTM D 1003.

* * * * *